No. 827,195. PATENTED JULY 31, 1906.
W. VON KOTHEN.
VALVE.
APPLICATION FILED FEB. 17, 1905.
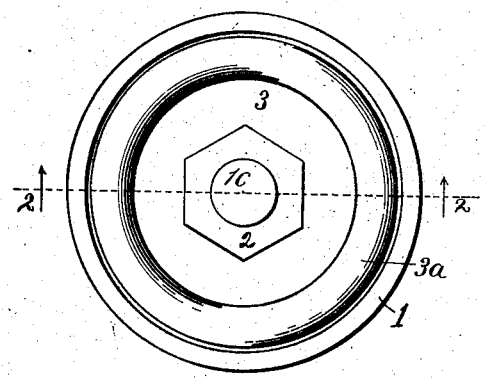
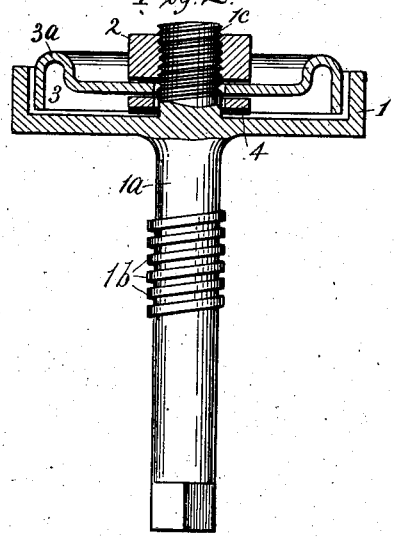
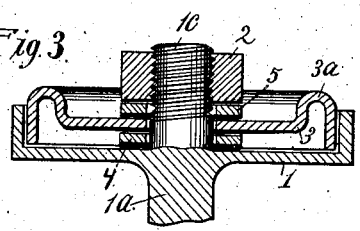
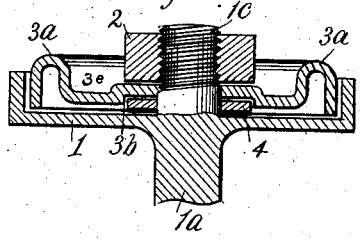
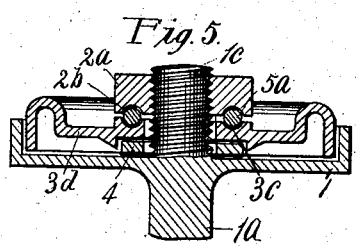
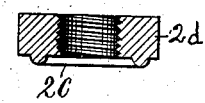
WITNESSES:
Chas. F. Barrett
F. C. Drager
INVENTOR
William Von Kothen.
BY
O. K. Trego
ATT'Y of Letters Patent.

UNITED STATES PATENT OFFICE.

WILLIAM VON KOTHEN, OF DALTON STATION, ILLINOIS.

VALVE.

No. 827,195.     Specification of Letters Patent.     Patented July 31, 1906.

Application filed February 17, 1905. Serial No. 245,936.

*To all whom it may concern:*

Be it known that I, WILLIAM VON KOTHEN, a citizen of the United States, residing at Dalton Station, in the county of Cook and State of Illinois, have invented certain new and useful Improvements in Valves, of which the following is a specification.

My invention relates to improvements in valves; and the object of my improvements is to provide a removable valve-face for valve-heads of the character herein shown and described.

In the drawings, Figure 1 is a plan view of the face of my improved valve; Fig. 2, a sectional view of same, taken on the line 2 2 of Fig. 1. Figs. 3, 4, and 5, sectional views showing modified forms of my valve, and Fig. 6 a sectional view of a nut of modified construction.

Referring to the drawings in detail, 1 represents a valve-head having a stem $1^a$, provided with threads $1^b$, adapted to engage threads in a valve-casing, and having a threaded post $1^c$ projecting from its face, and having an annular recess formed in its face surrounding said post.

Secured to the face of the valve-head by means of a nut 2 is a concavo-convex disk 3, having a central aperture to receive the post $1^c$ and having an annular convex valve-face $3^a$, adapted to engage a valve-seat, and having its outer edge formed at a right angle to the main plane of the disk and seated on the valve-head at the bottom of the annular recess.

Surrounding the post at the bottom of the recess is a gasket 4, made, preferably, from soft metal, as lead, or from other suitable pliable material and adapted to be engaged by the disk and to form a water or steam tight connection between the valve-head and the disk when the nut is screwed down tight against the latter.

In Fig. 3 I show a gasket 5, located between the disk and the nut and which is adapted to prevent the escape of fluid through the aperture in the disk.

In Fig. 4 I show a construction similar to that shown in Fig. 2, except that the disk $3^e$ is provided on its inner face with an annular shoulder $3^b$, adapted to engage the periphery of the gasket 4 and to prevent fluid under pressure which might pass through the aperture in the disk from expanding the gasket.

In Fig. 5 I show in place of the gasket 5, as in Fig. 3, a round gasket $5^a$, adapted to be engaged by an annular groove $2^b$ in the nut and by a similar groove $3^c$ in the disk $3^d$.

In Fig. 6 I show a nut $2^d$, having on one of its faces an annular rib $2^c$, adapted to engage the groove $3^c$ in the disk $3^d$. (Shown in Fig. 5.)

After my improved valve has been assembled and properly mounted in a suitable casing its operation is the same as any ordinary valve. If after a time its face $3^a$ should become injured, so as to cause leakage, the disk may be removed and a new disk substituted at a very slight expense.

Having thus described my invention, what I claim as new, and desire to secure by Letters Patent, is—

1. A valve comprising a head having a threaded post projecting from its face and having an annular recess formed in its face surrounding said post, a disk having a central aperture to receive said post and having its outer edge seated on the face of the valve-head at the bottom of the annular recess and having an annular valve-face, a gasket surrounding the post between the disk and valve-head, and a nut on said post exterior of the disk.

2. A valve comprising a head having a threaded post projecting from its face, a disk having its outer edge seated on the face of the head and having an annular valve-face and having a central aperture through which the post projects and having an annular groove in its outer face near the aperture, a gasket seated in said groove, and a nut on said post, said nut having formed in its inner face an annular groove engaging said gasket.

3. A valve comprising a head having a threaded post projecting from its face, a gasket surrounding said post adjacent to the head, a disk having its outer edge seated on the head and having a central aperture through which the post projects and having formed in its outer face an annular shoulder adapted to engage the periphery of the gasket and having formed in its outer face and near its aperture an annular groove, a gasket arranged in said groove, and a nut on said post, said nut having formed in its inner face an annular groove adapted to engage the latter gasket.

4. A valve comprising a head, a removable disk having its outer edge seated on the face of the head and having a convex annular face adapted to engage a valve-seat and having a portion encompassed by said convex annular face, said encompassed portion having an annular shoulder formed on its inner face, and means for clamping the encompassed portion of the disk to the head, and a gasket interposed between the head and disk and having its periphery encompassed by said shoulder.

5. A valve-disk having a central aperture, and provided with an annular portion surrounding said aperture and extending parallel with the main plane of the disk, and having an outer convex peripheral face surrounding said annular portion, and provided with an annular flange extending rearwardly from said convex peripheral face beyond the plane of the rear face of the first-named annular portion.

6. A valve-disk having a central aperture, and provided with an annular portion surrounding said aperture, and having on its outer face a raised annular convex portion surrounding said first-named annular portion, and provided with an annular flange extending rearwardly from said raised annular convex portion beyond the plane of the rear face, and having on its rear face a depressed annular convex portion directly opposite said raised annular convex portion.

7. A valve-disk, provided with a central aperture; and having on its outer face a raised annular portion adjacent to said aperture, a depressed annular portion surrounding said raised annular portion, and a convex annular portion surrounding said depressed portion and extending outwardly beyond the plane of the said raised portion; and having on its rear face an annular depressed portion adjacent to the said aperture, an annular raised portion surrounding said last-named depressed portion, and an annular depressed concave portion surrounding said last-named raised annular portion; and provided with a peripheral flange extending rearwardly from the said convex annular portion to a point beyond the plane of its rear face.

8. A valve-disk, provided with a central aperture; and having on its outer face an annular groove near said central aperture, and a raised convex peripheral portion; and provided with an annular flange extending rearwardly beyond its rear face.

9. A valve-disk provided with a central aperture, and having on its outer face a peripheral convex portion, and provided on its rear face with an annular groove near said aperture, and having an annular flange extending rearwardly beyond its rear face.

10. A valve-disk provided with a central aperture, and having on its outer face an annular groove and a raised convex peripheral portion, and provided on its rear face with an annular groove near said aperture, and having an annular flange extending rearwardly beyond its rear face.

11. A valve-disk provided with a central aperture, and having on its outer face a raised convex peripheral portion, and provided with an annular flange extending rearwardly at a right angle to and beyond the plane of its rear face.

In testimony whereof I affix my signature in presence of two witnesses.

WILLIAM VON KOTHEN.

Witnesses:
O. K. TREGO,
I. DANKS.